Feb. 23, 1926.  1,574,612
R. A. EATON
CEMENT BLOCK MOLD BOX
Filed May 23, 1924     4 Sheets-Sheet 1

WITNESSES

INVENTOR
Robert A. Eaton
BY
ATTORNEYS

Feb. 23, 1926.  1,574,612
R. A. EATON
CEMENT BLOCK MOLD BOX
Filed May 23, 1924     4 Sheets-Sheet 2

WITNESSES

INVENTOR
Robert A. Eaton
BY
ATTORNEYS

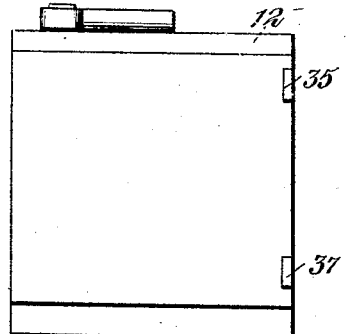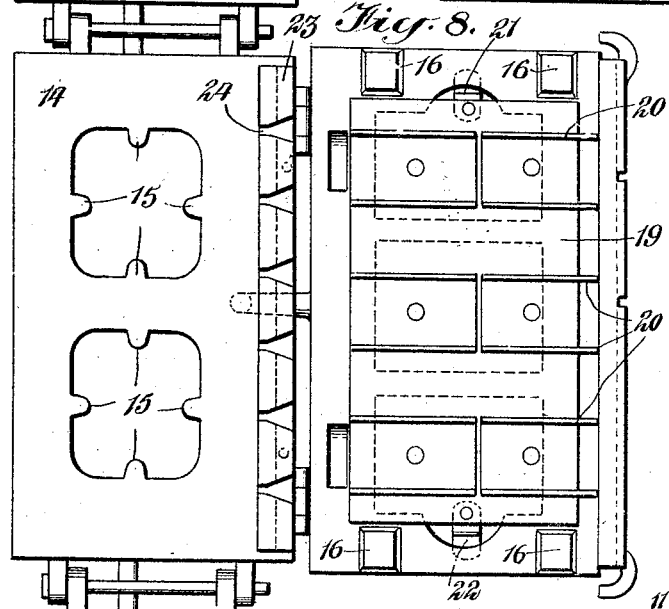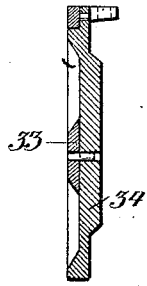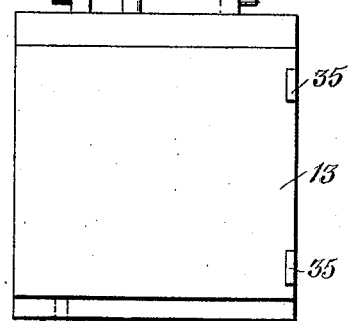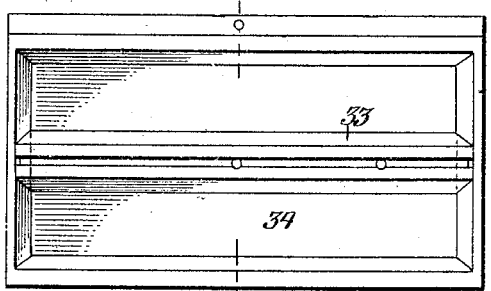

Feb. 23, 1926.

R. A. EATON 1,574,612

CEMENT BLOCK MOLD BOX

Filed May 23, 1924

WITNESSES

INVENTOR
Robert A. Eaton
BY
ATTORNEYS

Patented Feb. 23, 1926.

1,574,612

UNITED STATES PATENT OFFICE.

ROBERT ANANIAS EATON, OF HADDON HEIGHTS, NEW JERSEY.

CEMENT-BLOCK MOLD BOX.

Application filed May 23, 1924. Serial No. 715,310.

*To all whom it may concern:*

Be it known that I, ROBERT A. EATON, a citizen of the United States, and a resident of Haddon Heights, in the county of Camden and State of New Jersey, have invented Improvements in Cement-Block Mold Boxes, of which the following is a full, clear, and exact description.

This invention relates to improvements in concrete block mold boxes, and has for an object the provision of a simple and efficient means whereby the mold box of a concrete block machine can be readily adapted, with a minimum expenditure of time and labor, for the production of a plurality of different kinds and sizes of blocks.

Another object concerns the provision of simple and efficient means whereby the mold box of an ordinary cement block machine can be adapted for the production of a plurality of separate bricks of different sizes and forms.

A further object concerns the provision of various elements for use in connection with the mold box of a cement block machine whereby a wide variety of types of blocks can be made in the one machine.

A still further object concerns the provision of means whereby all the parts can be especially easily assembled for operation and dismantled for alterations.

The invention is illustrated in the drawings, of which—

Fig. 8 is a plan view of the plates of the mold laid out in a flat plane;

Fig. 9 is a side elevation of a partition;

Fig. 10 is a plan view of a modified form of bottom plate for the box;

Fig. 11 is a section on the line 11—11 of Fig. 10;

Figure 1:
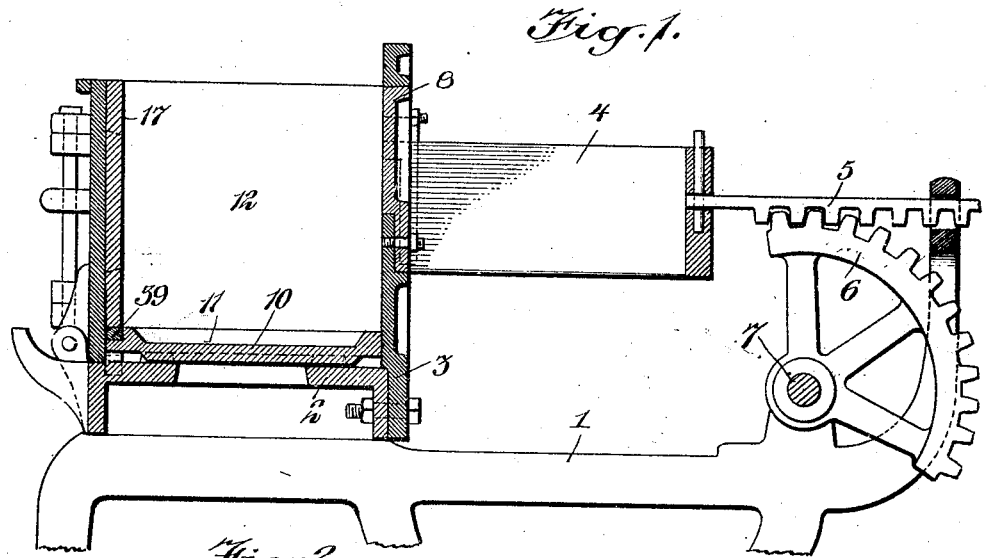
Figure 1 is a vertical section through a part of a cement block making machine.

The form of the invention shown in the drawings is a preferred form, although it is understood that modifications in the construction and arrangement of the parts and in the character of the materials used may be adopted without departing from the spirit of the invention as set forth in the appended claims.

One aspect of the invention from a general consideration thereof includes a mold box plate which is apertured for the passage therethrough of a core. This core may be of any desired shape for the purpose of forming suitable apertures in the blocks within the mold box and, consequently, the apertures in the wall or plate must correspond to the shape of the core. I have provided a wall plate suitably apertured and provided with auxiliary plates which, by ready attachment to the wall plate, will readily vary the shape of the opening in the wall plate in accordance with the core used.

In another aspect the invention includes the provision of a multicompartment mold adapted to be attached to the bottom plate of the ordinary mold box whereby a plurality of separate, independent bricks may be formed in one or more rows. This multicompartment mold is provided with a false bottom which is suitably formed to rest on the ordinary bottom of the mold and to support the bricks; and this false bottom is connected to one of the side walls of the mold box so that as this side wall is pivotally moved away from its normal position the bottom will be elevated out of the mold and carry with it the bricks, which are in this manner readily ejected from the mold in a group. The multicompartment mold is, furthermore, provided with a partition dividing the rows of bricks from each other. This partition can be easily removed and sand poured into the slot thus formed before the ejection of the bricks so that as they are ejected they are in condition ready for immediate storage or piling up.

A further aspect of the invention concerns the provision of various auxiliary bottom and side plates adapted to form bricks of various sizes and forms merely by the substitution of one mold for another.

A still further aspect of the invention includes the provision of simple elements whereby a bottom or side plate may be readily adjusted in different positions so that bricks of different thickness and height can be made merely by varying the adjustment of the walls of the box.

A preferred embodiment of the invention is shown in the drawings. It is applicable to the usual plunger type block-making machine and comprises a base 1 on which a base plate 2 is supported, this base plate being provided with a rear wall 3 suitably apertured to receive a core 4 operated through a rack 5 and a gear 6 mounted on a suitable power shaft 7 journaled on the base 1.

Figure 2:
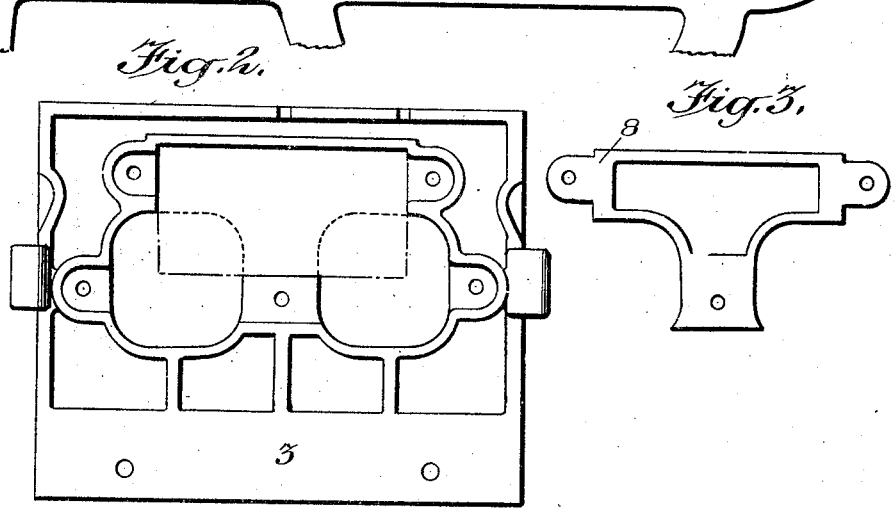
Fig. 2 is an elevation of one of the wall plates of the box.
Figure 3:
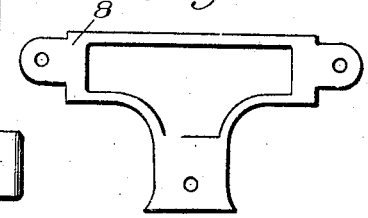
Figs. 3 and 4 are elevations of auxiliary plates for said wall plate.
Figure 4:

The rear wall of plate 2 is provided with apertures, and in order to vary the shape of the aperture through which the core 4 passes in accordance with the particular shape of plunger being used, I provide auxiliary plates, such as 8 and 9 shown in Figs. 3 and 4. It will be apparent from a consideration of Figs. 2, 3, and 4 that, with the aperture shown in Fig. 2, if the auxiliary plate shown in Fig. 3 is connected to the wall 3 there will result two separate apertures in the wall 3; whereas, if the auxiliary plate 9 is connected to the wall 3 the resultant aperture will be a single rectangular aperture. In this manner I can provide a single plate with a sufficient number of auxiliary plates so that the core-receiving aperture can be varied to suit a wide variety of cores. The representation in Fig. 1 shows the wall 3 with the plate 8 in position, the core 4 being in the form of two separate cores each entering one of the holes in the wall.

Resting on the base plate 2 is a bottom plate of the mold box, this plate being designated by the numeral 10. It has a depressed portion 11 to form one face of the block. The box is provided in the usual manner with pivoted end walls, such as 12 and 13 (see Fig. 8) and with a front wall 14, as shown in Fig. 8, this front wall being provided with openings in line with the openings in the rear wall 3. These openings are provided with projecting lugs 15 for purposes hereinafter to be described. The base plate is provided with a plurality of bosses 16 on which various auxiliary plates resting on the base plate are supported. It will be noticed from Fig. 8 that the end walls 12 and 13 are pivotally connected to the ends of the front wall 14, and that the front wall in turn is pivotally connected at its lower edge to the front edge of the base plate 2, so that by unlatching the end plates from engagement with the rear plate and then removing the front plate or wall pivoted around its pivoted axis, the entire mold box can be laid out flat, as shown in Fig. 8.

Figure 5:
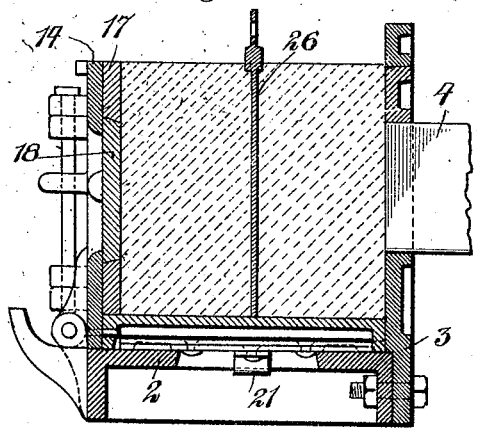
Fig. 5 is a vertical section through the box adapted for the production of a plurality of separate boxes with the partition shown in place.

Preferably, the inner face of the front wall 14 of the mold box is covered by an auxiliary front face 17 in which are disposed suitable plug plates 18 to fill in the apertures in this auxiliary plate when a solid wall is desired. For the purpose of holding these plug plates 18 from falling outwardly, the lugs 15 previously referred to are provided. In the ordinary use of the plate 17, however, these plugs will be removed so as to allow the core 4 to move all the way through the block to contact with the inner face of the wall 14. Where, however, different types of bricks are being formed, and where it is not desired to use the core, plugs 18 are put in place to make a solid wall and the plunger is advanced to the position shown in Figs. 5, 6, and 7 so as to fill up the apertures in the rear plate 3 with the ends of the core flush with the inner face of the rear wall 3.

Figure 6:
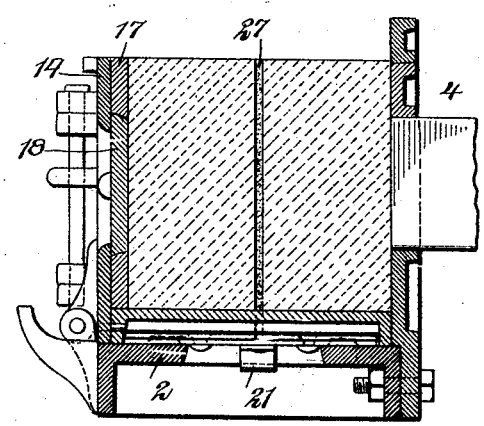
Fig. 6 is a similar view with the partition removed.
Figure 7:
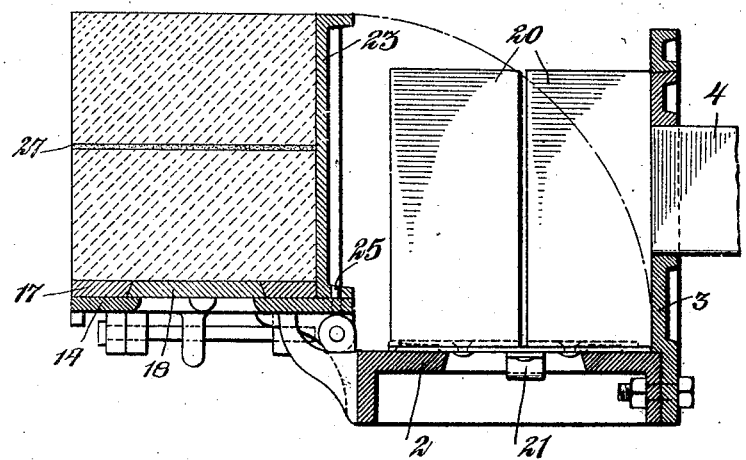
Fig. 7 is a similar section showing the set of bricks removed from the box.

In order to make a plurality of bricks on one or more rows in this mold box, I provide a multicompartment mold member, shown in Figs. 5, 6, 7 and 8. This mold member comprises a bottom plate 19 from which rises a plurality of transverse partition plates 20. These plates 20 are arranged in alined pairs spaced longitudinally the width of a brick apart, and spaced with their adjacent ends a slight distance apart, for a reason hereinafter to be mentioned. These partition plates forming the walls of the compartment plates 20 are of the height, or rather the length, of a brick. This multicompartment mold member is provided on the bottom of plate 19 with pivoted latch members 21 and 22 which can be moved under the surface of the base plate 2 to hold the compartment mold member in position thereon. With this member in place, I provide an auxiliary or false bottom 23, shown in Figs. 5, 6, 7 and 8. This false bottom is provided with a plurality of slits 24, and is attached at one end, along one edge, to the lower edge of the front wall 14, along the inner face thereof, by suitable pins such as 25. By means of this connection the false bottom will swing with the front wall 14 and, therefore, as seen in Fig. 7, when the front wall 14 is moved away from the mold box to a horizontal position, the false bottom 23 is moved to a vertical position, as shown in this figure, and will carry naturally with it the bricks which are resting thereon. By reason of the slits 24 the false bottom can be placed on top of the bottom 19 of the remaining mold member, since the slits will allow the partition plates 20 to pass therethrough. In order, therefore, to form a plurality of bricks, I attach the false bottom 23 to the front wall 14 and then move the front wall to its normal position, shown in Fig. 5, whereupon the false bottom will be moved into a horizontal position resting on the bottom plate 19. By then moving the end plates 12 and 13 to their normal position, and locking them to the rear plate 3, I have a mold box in which a plurality of bricks can be molded. I take, then, a removable partition plate 26, of a length equal to the length of the mold box, and place it in the position shown in Fig. 5, between the pairs of compartment plates 20 in the slot or groove formed therebetween so as to divide the bricks into two rows. The concrete or cement, or other material, is then poured into the mold and suitably pressed downward under the proper pressure. After the bricks have been formed I then remove the partition 26 and pour in sand, as shown in Fig. 6, into the slot. The end plates can then be unlatched and laid out flat with the front wall, as shown in Figs. 7 and 8. As the front wall, however, moves to its flattened position, it carries with it the false bottom 23 on which the bricks have been resting and naturally carry the bricks with it, moving them to the position shown in Fig. 7, namely, in their ejected position. The layer of sand, such as 27, shown will act as a separator between the two layers of bricks to prevent them from becoming stuck together until they have been laid away in storage and have dried out sufficiently. It will be noticed that on each side of the removable partition plate 26 are disposed strips such as 28 provided with notches 29. These strips bear on the adjacent upper ends of the compartment plates 20 with the ends of the plates lying in the notches 29. This is for the purpose of properly supporting the partition 26 in the mold. The ends of the partition plate 26 are provided with lips 30 and 31 which are adapted to pass over the edge of the end plates 12 and 13 to further engage the partition plate 26 in proper relation with the mold box.

Figures 12, 13:
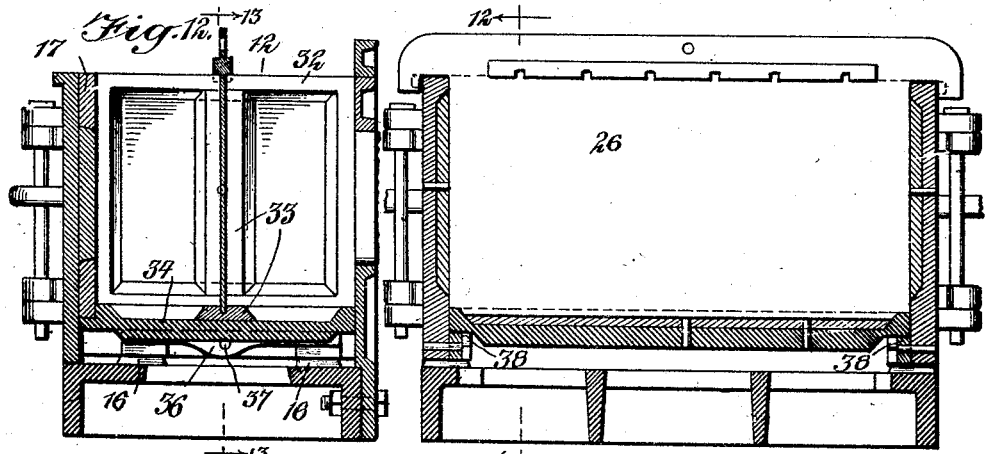
Fig. 12 is a section on the line 12—12 of Fig. 13.
Fig. 13 is a section on the line 13—13 of Fig. 12.
Figure 14:
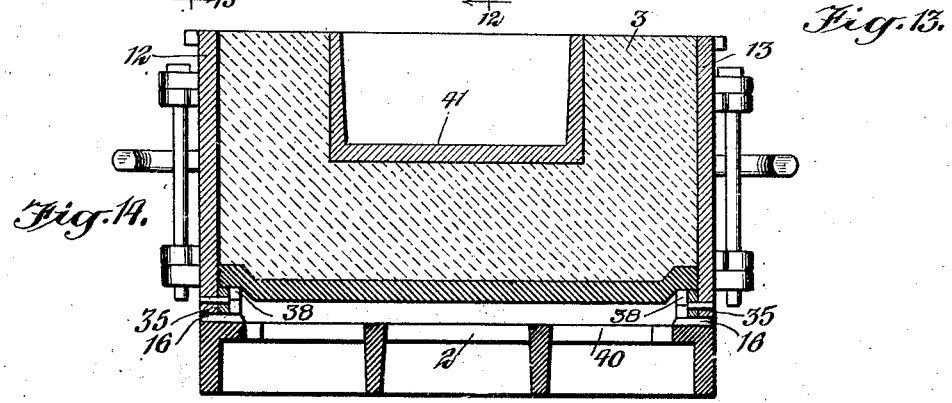
Fig. 14 is a vertical section taken through a modified arrangement of the box.

If, instead of forming a plurality of bricks, such as have been just described, it is desired to form two solid, separate blocks, I remove the end plates 12 and 13, which have ordinary plane faces, and substitute therefor end plates such as 32. These end plates are very similar to the bottom plate of the usual type, shown in Fig. 1, having the depressed recess 11, but in this case a central partition 33 is disposed vertically across the plate and across its combination plate at the opposite end of the box, because the mold is to be divided into two parts. This adjustable central partition 33 is provided with a slot to receive the end of the usual partition plate 26 which extends longitudinally in the usual manner to divide the mold box into two parts. To this end, also, the bottom plate 34, as shown in Fig. 12, is also provided with a partition of the type 33 having a groove to receive the bottom of the partition plate 26. In the usual practice the bottom plates 34 are adapted to rest, as shown in Fig. 14, on lugs 35 projecting inwardly from the lower edge of the end plates. However, when a higher than normal elevation is desired of these bottom plates it becomes necessary to attach to the end plates elevated strips or bars such as 36 (see Figs. 12 and 13). These bars are pinned at 37 to the inner face of the end plates, and have oppositely extending portions 38 which rest on the lugs 35, and the bottom plates in turn rest on the top of the ends of these bars or strips, whereby additional elevation is given to them. By removing these elevating bars or strips the normal level of the bottom plates can be restored. If the bottom plates, as shown in Fig. 12, are elevated it becomes, therefore, necessary to compensate for the fixed height of the auxiliary front face 17. Normally this front face, as shown in Fig. 1, rests on the removable strip 39 seated in the groove along the side of the usual auxiliary or false bottom plate 10. However, by removing this strip 39 the bottom of the auxiliary front face or plate 17 can rest in the bottom of the groove and, therefore, the top will remain flush with the top of the box.

Fig. 14 represents the arrangement of the parts when a chimney brick is to be formed, the bottom plate 40 being elevated as in Fig. 12, and the normal type of end plates 12 and 13 being used. In this case the core is of the U shape shown, designated by the numeral 41, to which end the rear wall or plate of the box is provided with the proper auxiliary plate 9 to present the proper core-receiving opening. The elevation of the bottom plate makes the brick less deep to allow for the thickness of mortar in laying two bricks side by side.

Figure 15:
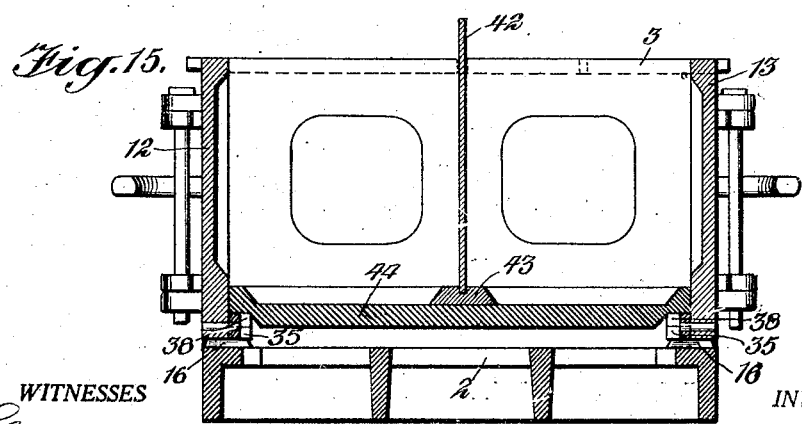
Fig. 15 is a vertical section taken through a still further modified form of box.

As shown in Fig. 15, I have provided the box with a transverse partition 42 the bottom of which is received in a transverse partition plate 43. In this case also the bottom plate 44 is elevated by means of the elevating bars 36 previously mentioned, because this particular brick is to be a little less deep than other types. Furthermore, it will be observed that the rear wall 3 is provided now with a double aperture the provision of which necessitates the use of the auxiliary plate 8 in the rear wall 3.

It will, therefore, be observed that by using the various parts supplied in accordance with this invention in addition to the ordinary mold box of a block-making machine, I can adapt the ordinary box for use in the production of quite a wide variety of blocks and bricks and that the various parts can be quickly attached to and detached from the box. It is further apparent that the various modified forms in which the box can be presented for use involve a minimum number of parts and a very simple manipulation, requiring very little time and labor on the part of the person using the machine. It is, furthermore, apparent that, especially in making groups of bricks, the bricks can be very quickly made, easily ejected, and when so ejected in accordance with the operation of my device, are ready immediately for storage without any further treatment.

What I claim is:—

1. In a concrete block mold box, fixed bottom and rear walls, a multicompartment mold member mounted on the bottom wall, a plurality of vertically extending spaced partition plates forming said mold member, said plates being arranged in pairs with their adjacent edges slightly spaced to form a longitudinal slot between the pairs, a partition plate adapted to be disposed in said slot to divide the multicompartment member into two groups of compartments, a false bottom adapted to rest on the bottom plate, and a front wall pivoted to the bottom plate to which said false bottom is attached, the front wall and the false bottom being rotatable to move the false bottom out of the compartment with the blocks thereon.

2. A method of ejecting blocks from a mold, which comprises forming the blocks in a plurality of spaced compartments in a mold member with a removable partition between groups of said compartments in a given plane, removing the partitions when the blocks have been formed, and pouring sand or some granular material into the slot thus formed to separate the groups of blocks, and then moving the blocks from a vertical into a horizontal position with a layer of intervening granular material disposed therebetween to prevent the blocks from sticking together until they are dry.

3. In a concrete block mold box, a plurality of vertically extending spaced plates to form mold compartments, said plates arranged in pairs with adjacent edges slightly separated, a partition plate to be disposed in the box in the groove formed by said spacing, strips formed on opposite sides of the partition plate having notches therein to engage the upper edges of the compartment plate to hold the partition plate in position.

4. In a concrete block mold box, a bottom plate, a fixed rear wall, a pivoted front wall, pivoted end walls adapted to be associated together in vertical planes to form a mold box, lugs inwardly projecting from the lower edges of the end wall adapted to support the auxiliary plates when desired, and auxiliary elevating strips adapted to be attached to the lower edges of the end plates with the ends of the strips resting on said lugs whereby the auxiliary plates adapted to rest thereon will be maintained at a higher desired level.

ROBERT ANANIAS EATON.